(12) United States Patent
Chung et al.

(10) Patent No.: US 7,277,139 B2
(45) Date of Patent: Oct. 2, 2007

(54) LIQUID CRYSTAL DISPLAY MODULE DEVICE

(75) Inventors: Myung Il Chung, Gyeongsangbuk-do (KR); Jong Wan Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 149 days.

(21) Appl. No.: 10/878,545

(22) Filed: Jun. 29, 2004

(65) Prior Publication Data

US 2005/0146650 A1    Jul. 7, 2005

(30) Foreign Application Priority Data

Sep. 29, 2003   (KR) .................... 10-2003-0067452

(51) Int. Cl.
*G02F 1/1333* (2006.01)
*G06F 1/16* (2006.01)

(52) U.S. Cl. .......................... 349/58; 349/59; 349/60; 361/681

(58) Field of Classification Search .......... 349/58–60; 361/681

See application file for complete search history.

(56) References Cited

U.S. PATENT DOCUMENTS

| | | | | |
|---|---|---|---|---|
| 6,175,396 | B1* | 1/2001 | Kim et al. | 349/58 |
| 6,199,987 | B1* | 3/2001 | Haba et al. | 353/34 |
| 6,552,761 | B1* | 4/2003 | Seo et al. | 349/58 |
| 6,583,831 | B2* | 6/2003 | Kim | 349/58 |
| 2003/0218700 | A1* | 11/2003 | Tsukamoto | 349/58 |

\* cited by examiner

*Primary Examiner*—Mike Qi
(74) *Attorney, Agent, or Firm*—Morgan, Lewis & Bockius LLP

(57) ABSTRACT

A liquid crystal display module device includes a frame receiving a backlight assembly provided with optical sheets, a liquid crystal panel mounted onto the frame, a bottom case affixed to the frame, a top case enclosing edge portions of the liquid crystal panel and coupled to the bottom case, and a clip inserted into a first region of a coupled portion of the bottom case and the top case.

13 Claims, 5 Drawing Sheets

LIQUID CRYSTAL DISPLAY MODULE DEVICE

The present invention claims benefit of Korean Patent Application No. 67452/2003 filed in Korea on Sep. 29, 2003, which is hereby incorporated by reference.

BACKGROUND OF THE INVENTION

1. Field of the Invention

The present invention relates to a liquid crystal display (LCD) device, and more particularly, to an LCD module device.

2. Description of the Related Art

As requirements for displaying of information increases, the demand for flat panel display devices having slim profiles, light weight, and low power consumption increases. The LCD device is one type of flat panel display device that has superior visibility, low power consumption, and low heat radiation, as compared to cathode ray tube (CRT) device having similar screen sizes. Accordingly, the LCD device is commonly used in hand-held terminal devices, computer monitors, and television devices. In addition, plasma display panel (PDP) devices and field emission display (FED) devices are currently being developed as other types of flat panel display devices.

The LCD device includes two facing substrates each having an electrode for generating an electric field, and a liquid crystal layer interposed therebetween. Accordingly, the display of images is controlling by alignment of liquid crystal molecules of the liquid crystal layer using an electric field generated by the electrodes of the two facing substrates.

FIG. 1 is a schematic cross sectional view of an LCD module device according to the related art. In FIG. 1, an LCD module device includes a main frame 14 that receives a backlight assembly for generating and controlling light therein, a panel guide 12 positioned along a horizontal direction on the main frame 14, an LCD panel 2 mounted on the panel guide 12, a bottom case 10 for fixing the main frame 14, and a top case 16 for enclosing edges of the LCD panel 2 and coupled to the bottom case 10. The top case 16 and the bottom case 10 are designed such that their sides mutually overlap, and are affixed at the overlapped portion by a connector.

The backlight assembly includes a lamp housing 18 provided with a lamp 20, a light guide plate 6 for converting linear light emitted from the lamp 20 into surface light, optical sheets 4 disposed on the light guide plate 6 for enhancing an efficiency of the surface light, and a reflector 24 disposed on a rear surface of the light guide plate 6 for reflecting the surface light toward a front side, i.e., toward the LCD panel 2.

The lamp housing 18 is L-shaped and encloses top and side portions of the lamp 20. The reflector 24 is disposed on the rear surface of the light guide plate 6 and extends to a bottom portion of the lamp 20 and contacts one end of the lamp housing 18. In addition, the optical sheets 4 include a stack comprising a diffusion sheet, a prism sheet, and a protection sheet. Furthermore, the main frame 14 includes one of a resin material and a metal material, and affixes and supports the backlight assembly. The panel guide 12 is molded from a resin material, such as polycarbonate, and is attached onto the lamp housing 18 to support a bottom edge portion of the LCD panel 2.

In FIG. 1, the LCD panel 2 includes an upper substrate 11, a lower substrate 13 that opposes the upper substrate 11, and a liquid crystal layer interposed between the upper substrate 11 and the lower substrate 13. Each of the upper substrate 11 and the lower substrate 13 has a polarizing plate attached onto an outer surface thereof. The lower substrate 13 includes a matrix array of gate and data lines, wherein a plurality of pixels and a plurality of thin film transistors (TFTs) that are connected to the pixels are provided at intersection regions of the gate and data lines. Although not explicitly shown in FIG. 1, electrical pads are formed along edge portion of the lower substrate 13 for receiving external signals. The electrical pads are electrically connected to a printed circuit board (PCB) 8 by a tape carrier package (TCP) 22. The PCB 8 is mounted on the main frame 14. In addition, a driving integrated circuit 26, which generates driving signals for driving the gate and data lines of the LCD panel 2 is mounted on the TCP 22. The PCB 8 provides control signals and the driving integrated circuit 26 generates driving signals that are supplied to corresponding ones of the gate/data lines through the electrical pads (not shown) of the LCD panel 2.

FIG. 2 is an enlarged view of region A of FIG. 1 according to the related art. In FIG. 2, the stacked optical sheets 4 wrinkle/distort along a width direction due to excessive amounts of heat or moisture. In most cases, the wrinkles/distortions are generated in the optical sheets 4 within a gap G between the LCD panel 2 and the optical sheets 4. Accordingly, the wrinkles do not permit uniform light to be transmitted through the optical sheets 4. As a result, wrinkled/distorted images are displayed on the LCD panel 2, thereby lowering image quality. In addition, the wrinkles of the optical sheets 4 make edge portions of the displayed images appear darkened.

SUMMARY OF THE INVENTION

Accordingly, the present invention is directed to an LCD module device that substantially obviates one or more problems due to limitations and disadvantages of the related art.

An object of the present invention is to provide an LCD module device that may prevent distortion of optical sheets.

Another object of the present invention is to provide an LCD module device that eliminates a gap between an LCD panel and optical sheets.

Additional features and advantages of the invention will be set forth in the description which follows, and in part will be apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
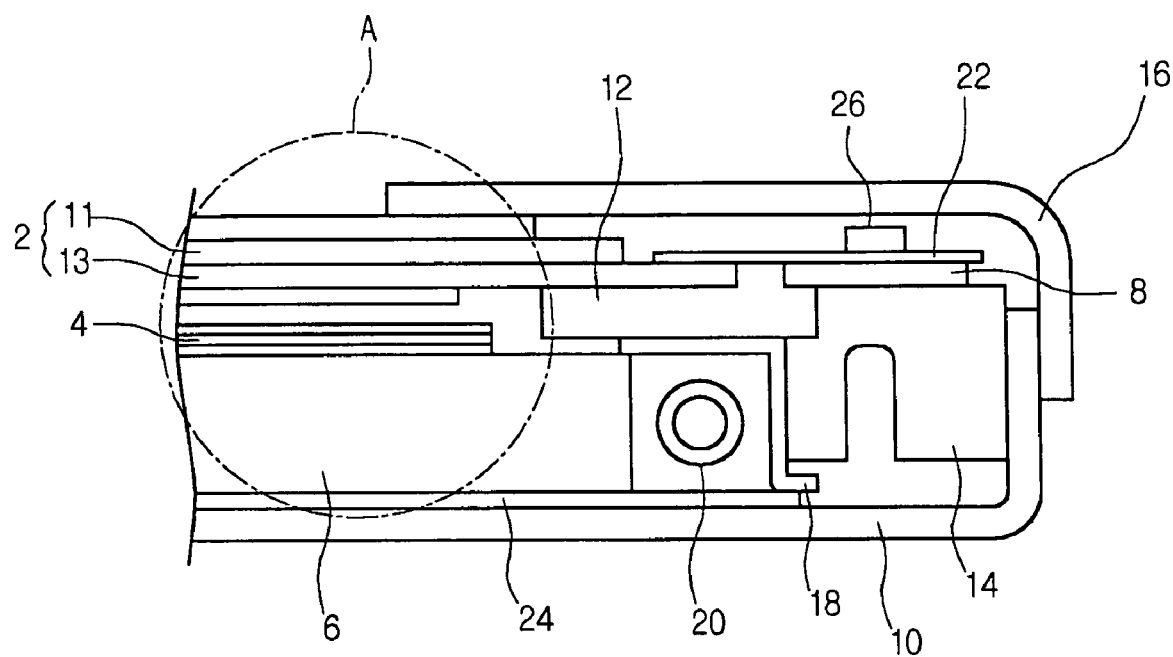
FIG. 1 is a schematic cross sectional view of an LCD module device according to the related art.
Figure 2:
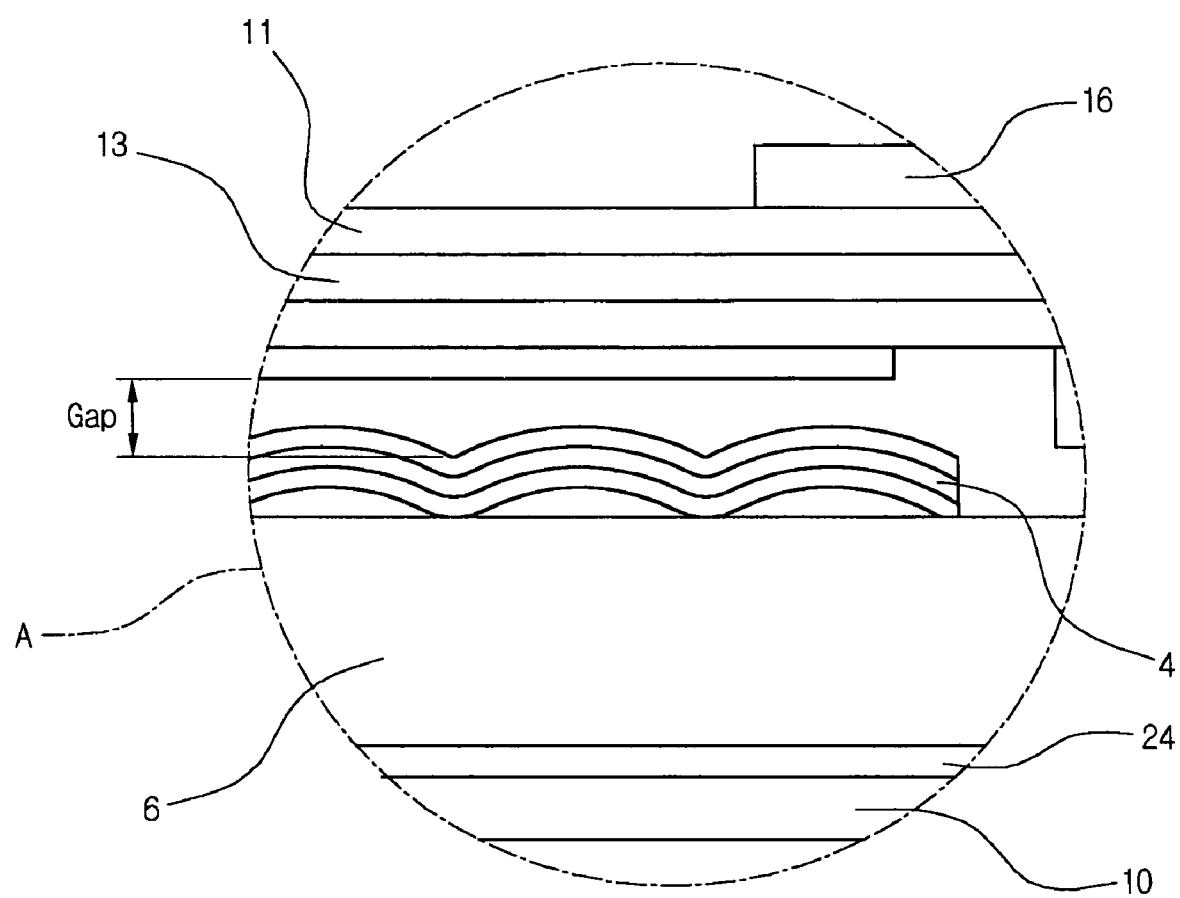
FIG. 2 is an enlarged view of region A of FIG. 1 according to the related art.
Figure 3:
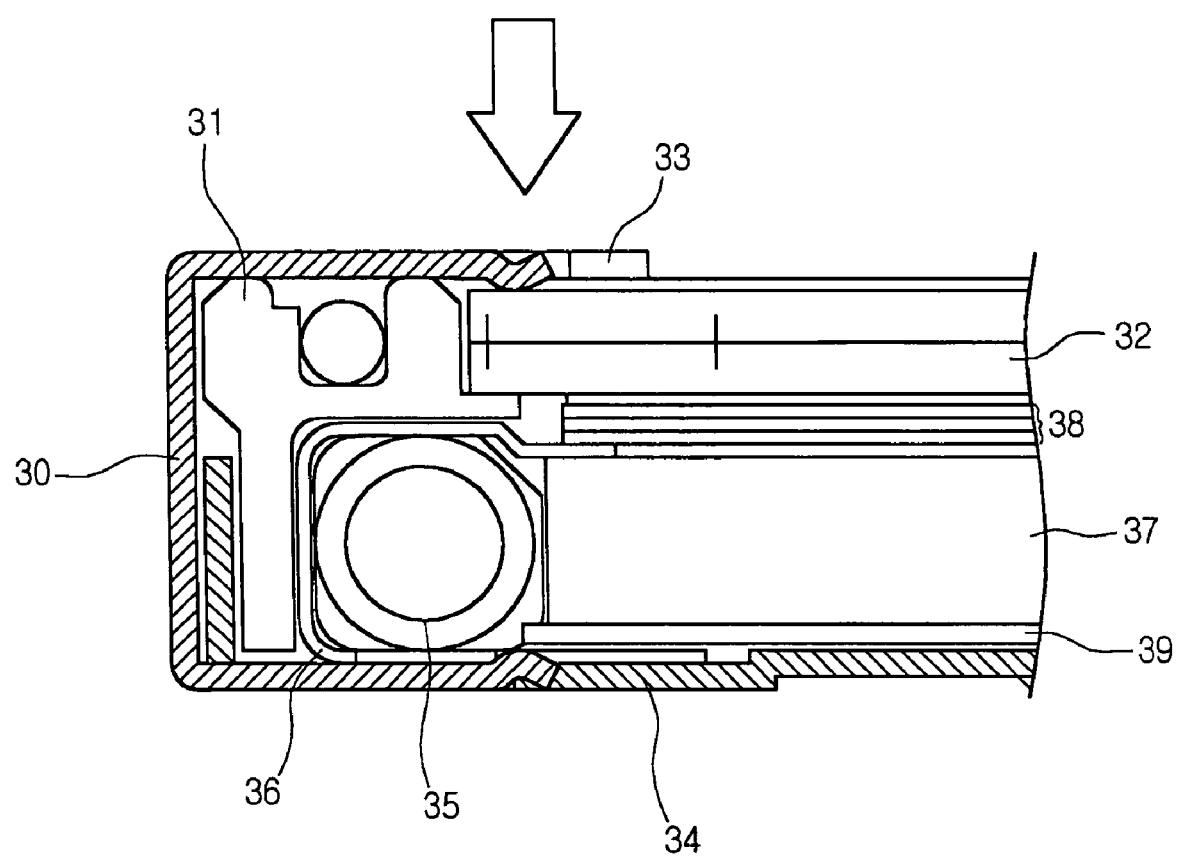
FIG. 3 is a schematic cross sectional view of an exemplary LCD module device according to the present invention.

FIG. 3 is a schematic cross sectional view of an exemplary LCD module device according to the present invention. In FIG. 3, an LCD module device may include a main frame 31 receiving a backlight assembly for generating and controlling light, an LCD panel 32 mounted on the main frame 31, a bottom case 34 affixing the main frame 31, a top case 33 enclosing edge portions of the liquid crystal panel 32 and coupled to the bottom case 34, and a clip 30 inserted into a region of a coupled portion of the bottom case 34 and the top case 33. The main frame 31 may include one of a resin material and a metal material, and may affix and support the backlight assembly. In addition, the top case 33 and the bottom case 34 may have their sides overlapping by a predetermined area, and may be affixed at the overlapped portion by a fastener or a hook system. Furthermore, the clip 30 may be formed at a region of a coupling portion of the bottom case 34 and the top case 33.

The backlight assembly may include a lamp housing 36 provided with a lamp 35, a light guide plate 37 for converting linear light emitted from the lamp 35 into surface light, optical sheets 38 disposed on the light guide plate 37 for enhancing an efficiency of the surface light, and a reflector 39 disposed on a rear surface of the light guide plate 37 for reflecting the surface light toward a front side, i.e., toward the LCD panel 32.

The lamp housing 36 may have a U-shape, and may enclose top, bottom, and side portions of the lamp 35. In addition, the reflector 39 may be disposed on the rear surface of the light guide plate 37 and contact one end of a lower side portion of the lamp housing 36. The optical sheets 38 may include a diffusion sheet, a prism sheet, and a protection sheet in a stack configuration.

Although not explicitly shown, the liquid crystal panel 32 may include an upper substrate, a lower substrate opposing the upper substrate, and a liquid crystal layer interposed between the upper substrate and the lower substrate. Each of the upper substrate and the lower substrate may have polarizing plates attached on an outer surface thereof. In addition, the lower substrate may include a matrix array of gate and data lines, wherein a plurality of pixels and a plurality of thin film transistors (TFTs) that are connected to the pixels may be provided at intersection regions of the gate and data lines. In addition, electrical pads may be formed along edge portion of the lower substrate for receiving external signals, wherein the electrical pads may be electrically connected to a printed circuit board (PCB) by a tape carrier package (TCP).

Figure 4:
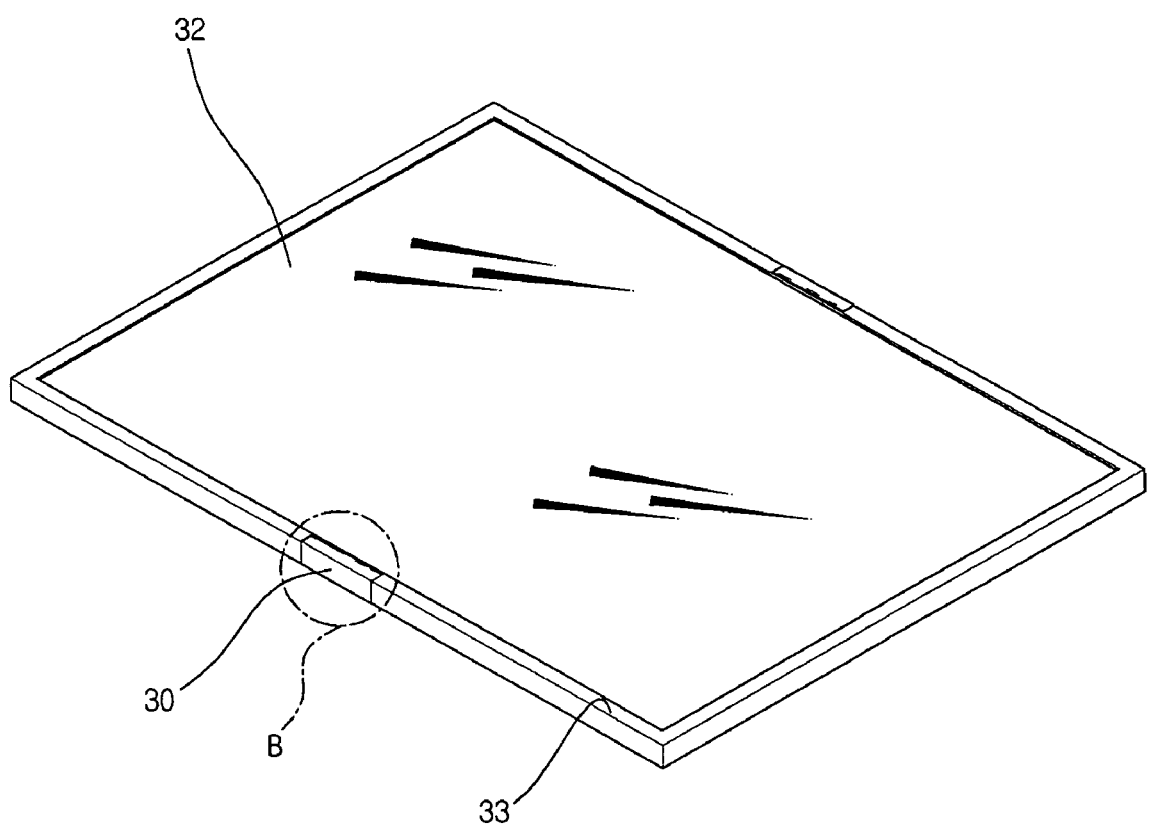
FIG. 4 is a perspective view of the LCD module device of FIG. 3 according to the present invention.
Figure 5:
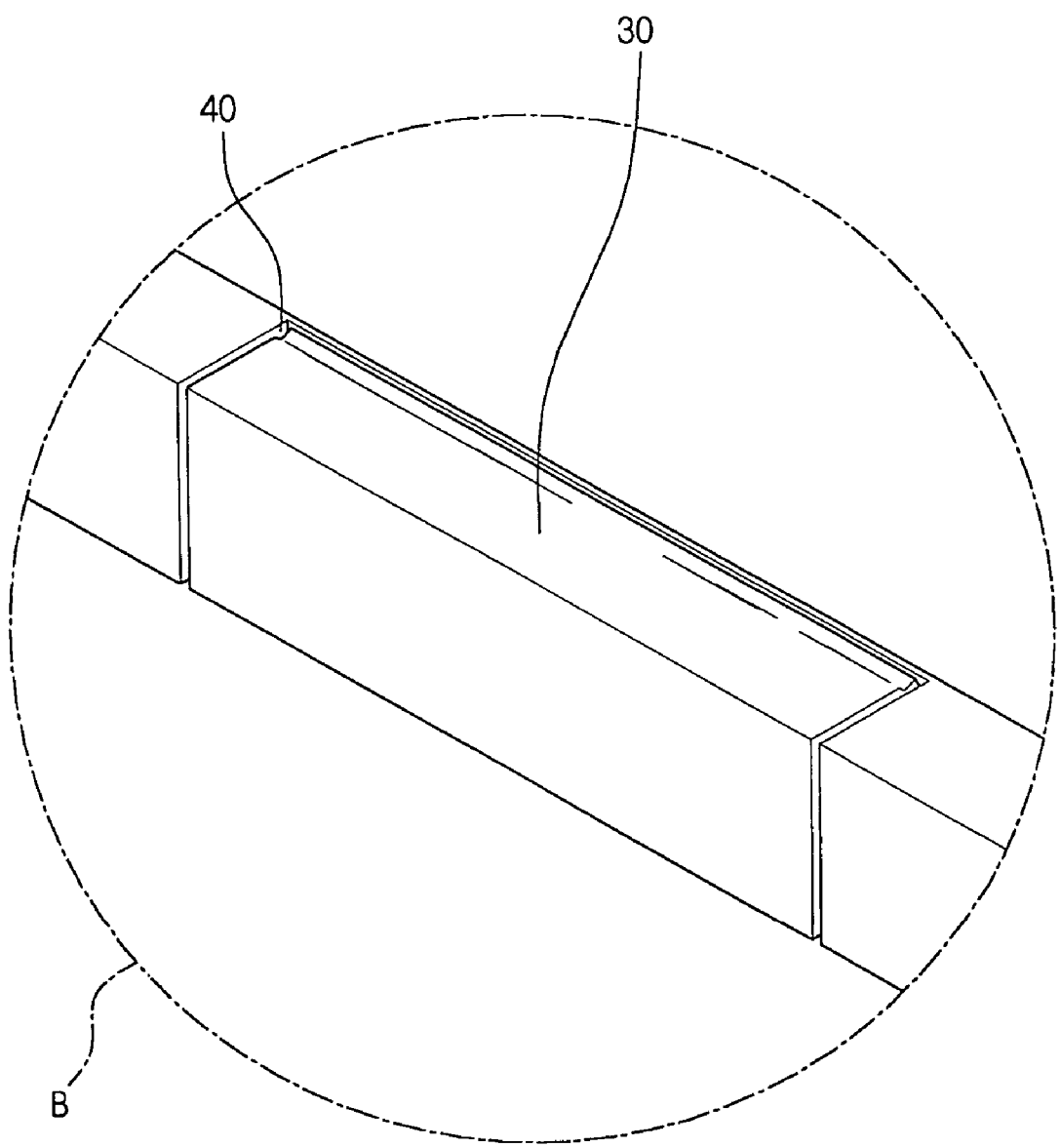
FIG. 5 is an enlarged view of region B of FIG. 4 according to the present invention.

FIG. 4 is a perspective view of the LCD module device of FIG. 3 according to the present invention, and FIG. 5 is an enlarged view of region B of FIG. 4 according to the present invention. In FIG. 5, a mounting groove 40, which may be equal in size to the clip 30, may be formed at predetermined region of the top case 33 and the bottom case 34 where the clip 30 is inserted. The clip 30 may be inserted into the mounting groove 40, wherein the mounting groove 40 may be formed at both of the bottom case 34 and the top case 33. The insertion position of the clip 30 may correspond to a light inlet portion of the light guide plate 37, or along an edge portion of the optical sheets 38 (in FIG. 3) disposed near the lamp 35 (in FIG. 3).

As shown in FIG. 3, since relatively high temperatures may be generated at a region where the lamp 35 may be installed, as compared with other regions, such as a portion of the light guide plate 37, and may cause wrinkling/distortion of the optical sheets 38, the clip 30 may be positioned along a lengthwise direction of the lamp 35. For example, the clip 30 may be positioned at a central region along the lengthwise direction of the lamp 35.

In FIG. 5, the clip 30 may be U-shaped, wherein end portions of the clip 30 may bend inwardly such that the end portions are parallel with surfaces of the LCD panel 32. Accordingly, the end portions of the clip 30 may have an elastic force along a direction between the end portions. Thus, when the clip 30 is inserted into the mounting groove 40, the end portions of the clip 30 may press against the parallel surfaces of the LCD panel 32 due to the elastic force of the end portions.

As shown in FIG. 3, the end portions of the clip 30 have a separation distance that may be equal to or less than a distance between the top case 33 and the bottom case 34 such that the clip 30 may not protrude along an outwardly direction. The clip 30 may be formed of a material that is identical to that of the top case 33 and/or the bottom case 34. Alternatively, the clip 30 may be formed of material(s) different from the material of the top case 33 and/or the bottom case 34. Thus, the clip 30 may continuously press against the LCD panel 32, thereby preventing formation of gap between the LCD panel 32 and the optical sheets 38. Accordingly, wrinkling/distortion of the optical sheets 38 may be prevented, eventhough the lamp 35 may produce relatively large amounts of heat. In other words, the wrinkling/distortion of the optical sheets 38 due to the relatively large amounts of heat generated by the lamp 35 may be prevented by the continuous pressing of the clip 30 against the LCD panel 32, thereby preventing formation of a gap between the LCD panel 32 and the optical sheets 38.

It will be apparent to those skilled in the art that various modifications and variations can be made in LCD module device of the present invention. Thus, it is intended that the present invention covers the modifications and variations of this invention provided they come within the scope of the appended claims and their equivalents.

What is claimed is:

1. A liquid crystal display module device, comprising:
   a frame receiving a backlight assembly provided with optical sheets;
   a liquid crystal panel mounted onto the frame;
   a bottom case affixed to the frame;
   a top case enclosing edge portions of the liquid crystal panel and coupled to the bottom case; and
   a clip inserted into a first region of a coupled portion of the bottom case and the top case to constrain peripheral edge portions of the optical sheets between the liquid crystal panel and the backlight assembly, the peripheral edge portions include outermost portions of the optical sheets, an upper portion of the clip is in direct contact with the liquid crystal panel by penetrating through the top case.

2. The device according to claim 1, wherein the clip has end portions that continuously presses against the liquid crystal panel to eliminate formation of a gap between the liquid crystal panel and the peripheral edge portions of the optical sheets.

3. The device according to claim 2, wherein the first region has a plurality of mounting grooves upon which the end portions of the clip are mounted.

4. The device according to claim 3, wherein a length of each of the mounting grooves is substantially the same as a length of the clip.

5. The device according to claim 3, wherein a first one of the plurality of mount grooves is formed at a portion of the bottom case and a second one of the plurality of mounting grooves is formed at a portion of the top case.

6. The device according to claim 1, wherein the clip has a U-shape including end portions formed approximately parallel to each other and a central portion between the end portions.

7. The device according to claim 6, wherein the end portions continuously presses against the liquid crystal panel to eliminate formation of a gap between the liquid crystal panel and the peripheral edge portions of the optical sheets.

8. The device according to claim 7, wherein the end portions provide an elastic force.

9. The device according to claim 7, wherein a distance between the end portions is substantially the same as a distance between the top case and the bottom case.

10. The device according to claim 1, wherein the clip and one of the top case and the bottom case are formed of the same material.

11. The device according to claim 1, wherein the clip is positioned along the peripheral edge portions of the optical sheets adjacent to a lamp of the backlight assembly.

12. The device according to claim 1, wherein the clip is positioned along a lengthwise direction of a lamp of the backlight assembly.

13. The device according to claim 12, wherein the clip is positioned at a central region of the lamp along the lengthwise direction of the lamp.

* * * * *